United States Patent [19]

Zelinka et al.

[11] Patent Number: 4,540,877
[45] Date of Patent: Sep. 10, 1985

[54] CONSTANT CURRENT CLOSED LOOP CONTROLLER FOR ROTATING SYSTEM

[75] Inventors: Richard J. Zelinka, Circle Pines; George K. Sutherland, White Bear Lake; Thomas J. Thielen, Minneapolis, all of Minn.

[73] Assignee: Sys-Tec, Inc., Minneapolis, Minn.

[21] Appl. No.: 564,032

[22] Filed: Dec. 21, 1983

Related U.S. Application Data

[63] Continuation of Ser. No. 354,654, Mar. 4, 1982, abandoned.

[51] Int. Cl.³ ............................................. H05B 1/02
[52] U.S. Cl. .................................... 219/497; 219/501; 219/491; 323/312; 323/909
[58] Field of Search ............... 219/501, 497, 216, 494, 219/490, 491; 307/117; 323/315, 312, 907, 909

[56]  References Cited

U.S. PATENT DOCUMENTS

| | | | |
|---|---|---|---|
| 3,637,984 | 1/1972 | Irvine | 219/501 |
| 3,813,516 | 5/1974 | Kudsi et al. | 219/216 |
| 4,021,722 | 5/1977 | Crowle | 219/501 |
| 4,114,023 | 9/1978 | Zelinka et al. | 219/494 |

OTHER PUBLICATIONS

IBM Technical Disclosure Bulletin, vol. 12, #4, 9/1969, p. 617, "Temperature Transducer".

Primary Examiner—M. H. Paschall
Attorney, Agent, or Firm—Orrin M. Haugen; Thomas J. Nikolai; Douglas L. Tschida

[57]  ABSTRACT

A temperature controller for monitoring the temperature of a rotating heating system and regulating the temperature relative to a desired temperature. A transmitter within the rotating system coupled to a remote stationary controller via slip rings produces a magnitude varying current control signal within a calibrated range at a magnitude proportional to the sensed temperature. A pair of voltage dividers within the transmitter establish the level and range of current magnitude relative to a constant current source. The remote stationary controller compares the current control signal to a setpoint and synchronously supplies power to the heater elements of the rotating system, so long as the sensed temperature is below the desired temperature.

4 Claims, 2 Drawing Figures

CONSTANT CURRENT CLOSED LOOP CONTROLLER FOR ROTATING SYSTEM

This is a continuation of application Ser. No. 354,654, filed Mar. 4, 1982 now abandoned.

BACKGROUND OF THE INVENTION

The present invention relates to a closed loop control scheme for a rotating system. In particular, it relates to a temperature regulation scheme, whereby a constant current signal proportional to the temperature within a rotating drum is produced and coupled to a remote stationary controller that synchronously supplies power to heater elements within the rotating system.

A problem attendant with heat controllers for rotating heating systems is that of not being able to accurately, and in a cost effective manner, sense temperature and control the switching of power to the heating elements. Heretofore, a number of different techniques have been employed, and the most pertinent of which can be found upon reference to U.S. Pat. Nos. 3,637,984; 4,097,723; 3,674,963; 3,278,723; and 4,127,764. These patents generally show various electro-mechanical combinations that employ slip rings and/or inductive coupling or photo conductive coupling of control signals and/or switch power to the heater elements via pulse width modulation or frequency comparison techniques.

With reference to U.S. Pat. No. 4,114,023, which is assigned to the present assignee, there is described an open-loop control arrangement. It too does not suggest the present, improved, closed-loop scheme. Thus, nowhere, in the prior art of which we are aware is a closed-loop control system shown for generating a constant current signal proportional to the temperature within a rotating drum along with means for transmitting the current signal to a stationary controller, whereat the current signal is compared to a set-point signal and the zero-crossing of the line voltage so as to synchronously switch a triac type semiconductor switch and supply power to the heating elements, when the temperature within the drum falls below the set-point.

The above advantage and those various other advantages and objectives that are achieved via the present invention will, however, become more apparent upon a reading of the following description and upon reference to the following drawings.

SUMMARY OF THE INVENTION

The present invention comprises a closed loop control apparatus for a rotating system, whereby a constant current signal proportional to the temperature within the rotating system is transmitted via slip rings to a remote, stationary controller. The remote controller, in turn, compares the current signal to an established set-point and the zero-crossings of the line voltage so as to synchronously switch a switch means and thereby provide power to the heating elements, when the temperature falls below the set-point.

The constant current temperature sensing circuitry generally comprises a voltage regulator that is coupled to the line voltage, a temperature sensitive resistance network and a buffer which together control the gate drive to a field effect transistor (FET) so as to produce a constant current signal that is proportional to the temperature within a rotating drum.

The remote stationary controller, in turn, comprises a voltage regulator, means for establishing a set-point or reference temperature, means for comparing the constant current signal to the established set-point and means for detecting zero-crossings of the line voltage so as to synchronously switch a triac and thereby supply power to the heating elements, when the sensed temperature falls below the set point.

DESCRIPTION OF THE PREFERRED EMBODIMENT

Figure 1:
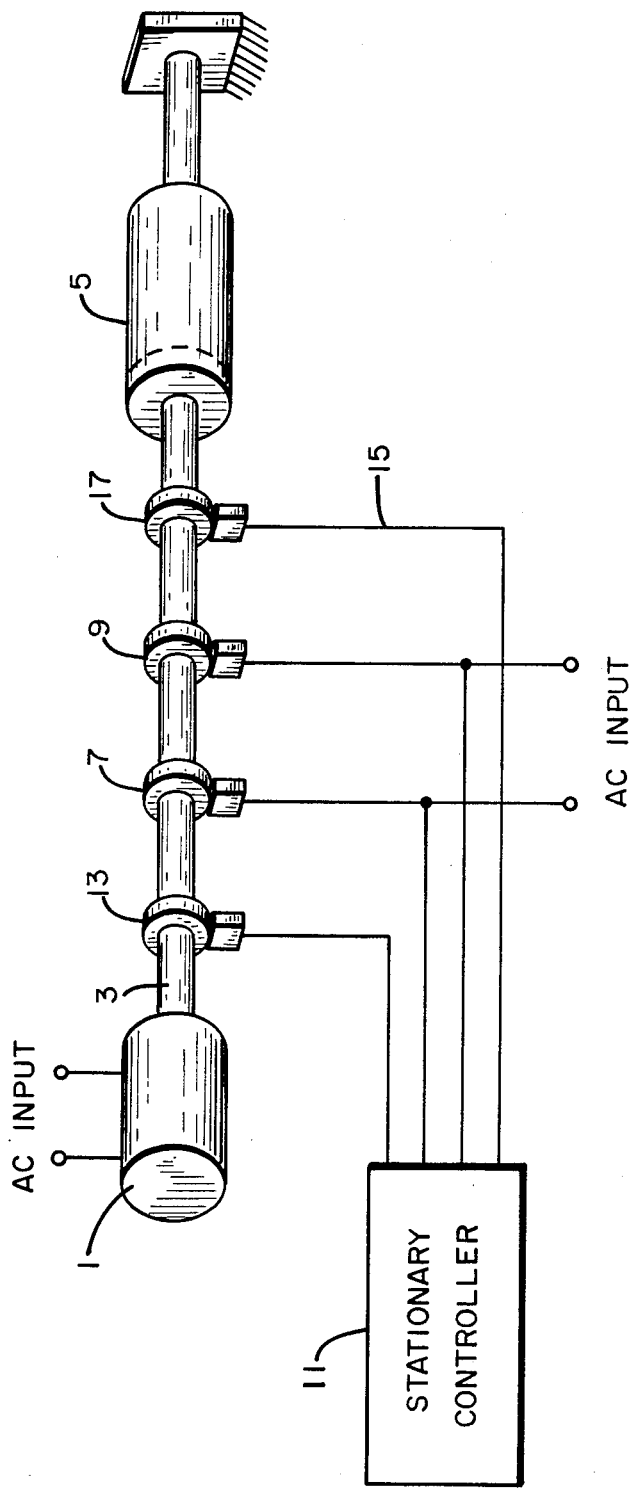
FIG. 1 shows a generalized electro-mechanical block diagram of the preferred embodiment.

Referring first to FIG. 1, there is shown a generalized block diagram of the present rotating system and its associated closed-loop controller. Generally, the system is comprised of a motor 1 that is coupled via a drive shaft 3 to a rotating drum 5. The drum 5 contains a plurality of heater elements (not shown) that are disposed about the interior of the drum 5 so as to produce a generally uniform temperature gradient across the exterior surface of the drum 5. Electrical power is supplied to the system via the AC input lines that are coupled to the motor 1, the slip rings and brushes 7 and 9 and the remote stationary controller 11. The power applied to the slip rings and brush combinations 7 and 9 is also coupled to a rotary controller (FIG. 2) contained within the drum 5 or mounted on the shaft 3, and rotating with the drum 5.

As will be described in greater detail below, the rotary controller generally acts to monitor the temperature within the drum 5 and to couple a constant current signal proportional to this temperature to the stationary controller 11 via the brush and slip ring combination 13. Similarly, the stationary controller 11, upon comparing the sensed current signal to a set-point signal that is established to be proportional to the temperature at which it is desired to maintain the temperature within the drum 5 and to the zero-crossing point of the AC input signal, produces a control signal which is used to switch a switch means (i.e. a triac in the preferred embodiment) within the stationary controller 11 and supply power to the heaters via control line 15 and the slip ring and brush combination 17. Thus, as the temperature within the drum 5 falls below the set-point established within the stationary controller 11, power is applied to the heater elements in order to maintain the temperature within the drum 5 at the temperature corresponding to the set point.

The present control scheme therefore operates in a closed-loop fashion, as opposed to the open-loop fashion previously disclosed by two of the present inventors in their U.S. Pat. No. 4,114,023. The present invention, while incorporating many of the teachings of the previous patent, however, achieves a more even control of the temperature within the drum 5. This improvement, as well as the composition and operation of the remote stationary and rotary controllers, will however become more apparent upon reference to FIG. 2 and the following discussion thereof.

Figure 2:
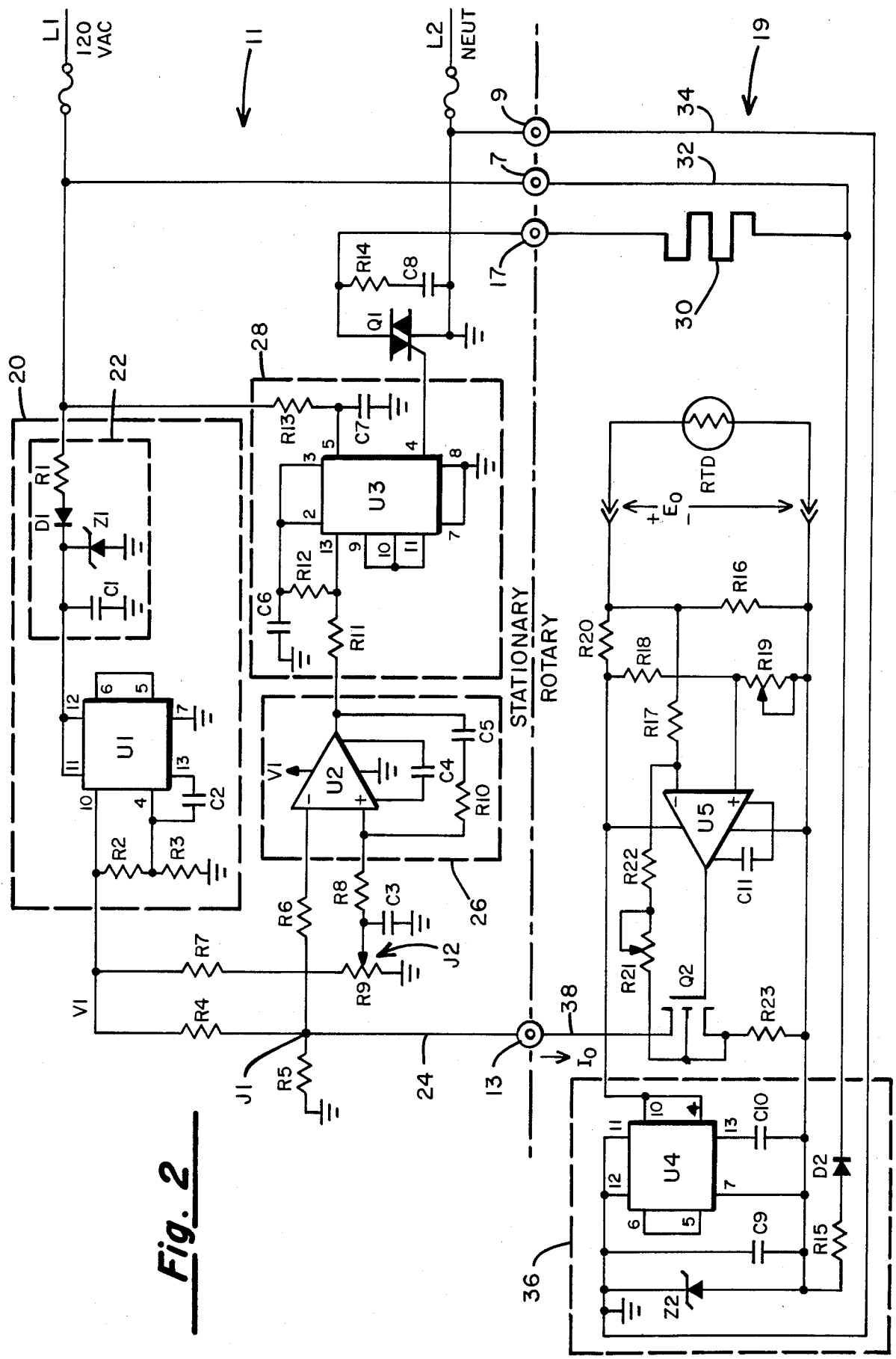
FIG. 2 shows an electrical schematic of the circuitry of the rotary transmitter and the remote stationary controller.

Referring to FIG. 2, an electrical schematic diagram is shown of the stationary and rotary controllers 11 and 19. Referring first to the portion that shows the stationary controller 11, AC power is supplied to the stationary controller 11 as well as the rotary controller 19 and system via the fused lines L1 and L2. The stationary controller 11 converts the nominal, unregulated AC input, typically at 120 volts, to a regulated DC voltage via the voltage regulator 20. In particular, the AC to DC converter 22, comprised of the combination of resistor R1, diode D1, Zener diode Z1 and capacitor C1, first halfwave rectifies the AC input so as to produce a rough regulated DC signal of approximately 20 volts, as established by the cutoff voltage of the Zener diode Z1. This DC signal, in turn, is further regulated and stepped down to the voltage V1, typically 10 volts DC, via the voltage regulator U1 in combination with resistors R2 and R3 and capacitor C2. In the preferred embodiment, the voltage regulator U1 may be a Fairchild or National Semiconductor Model. No. LM723. Thus, the voltage regulator 20 converts the AC input into a closely regulated 10 volt DC signal that is used to power the circuitry of the stationary controller 11.

As mentioned, the constant current signal, proportional to the sensed temperature within the drum 5, is received via the brush and slip ring combination 13 on conductor 24. The sensed current signal is next applied to the voltage divider comprised of resistors R4 and R5 so as to produce a voltage at the junction J1 that is indicative of the temperature within the drum 5. Specifically, the voltage at the junction J1 is designed to correspond to a drum temperature in the ratio of 10 millivolts per degree Fahrenheit. The voltage at the junction J1 is then applied to the negative input terminal of the comparator 26 via the relatively high impedance path containing resistor R6.

The set-point temperature or desired temperature within the drum 5 is established via the network comprised of resistors R7 and R8, potentiometer R9 and capacitor C3, which acts to produce a filtered constant voltage on the positive input terminal of the comparator 26. The voltage level corresponding to the set-point temperature is established via the potentiometer R9, and which may be adjusted by turning an appropriate knob on the stationary controller 11. By properly setting the potentiometer R9, the operator thus establishes the reference voltage or set-point temperature within the drum 5. In particular by knowing the constant current that corresponds to the desired set-point temperature, and having a potentiometer R9 with an adequate resistance range, an operator can adjust the set-point voltage at the junction J2 to this level so that variations below this voltage at the junction J1 will cause power to be supplied to the heater elements.

The comparator 26, which is comprised of resistor R10, capacitors C4 and C5 and the comparator U2, typically an RCA Model No. CA3130S, thus acts to compare the set-point voltage from the J2 junction to the sensed current (converted to voltage), from the rotary controller 19 at the J1 junction. Should the voltage on the inverting or minus terminal of the comparator 26 fall below the set-point voltage on the non-inverting or positive terminal of the comparator 26, a control signal will be produced that will be acted upon by the zero-crossing detector 28.

The zero-crossing detector 28, comprised of resistors R11 and R12, capacitor C6 and detector U3, typically a RCA Model No. CA3059 monitors the AC input line L1 via the resistor R13 and capacitor C7 so as to determine when the AC input crosses the zero or ground reference voltage level in either a positive to negative or a negative to positive fashion. If the voltage level at the J1 junction has fallen below the set-point voltage level, when a zero-crossing occurs, a trigger signal is produced by the zero-crossing detector 28, that activates the gate of triac Q1. The activation of triac Q1, in turn, causes an AC Power to be applied to the slip ring and brush combination 17 and the heater element 30. Capacitor C8 and resistor R14 are added as a snubber to minimize the effect of power line transients and spikes on triac Q1.

Upon supplying power to the heater element 30, the temperature within the drum 5 rises. Correspondingly, the sensed voltage at the J1 junction rises to the point where it exceeds the set point voltage at the J2 junction. However, until the temperature exceeds the set-point voltage, trigger signals continue to be produced and the heater element 30 continues to heat the drum 5. Once the sensed voltage exceeds the set-point voltage, the zero-crossing detector 28 discontinues producing trigger signals and the heater element 30 is disconnected.

Attention is now directed to the portion of FIG. 2 that shows the rotary controller 19 and which produces the sensed voltage at the J1 junction. The rotary controller 19 receives its power via the slip rings and brushes 7 and 9, and which couple the AC input voltage, via lines 32 and 34, to the voltage regulator section 36 of the rotary controller 19. The voltage regulator 36 is essentially identical to the voltage regulator 20 and is comprised of resistor R15, capacitors C9 and C10, diode D2, Zener diode Z2 and voltage regulator U4. The voltage regulator 36, thus produces a regulated 10 volt DC signal that is used to power the circuitry of the rotary controller 19.

The temperature within the rotating drum 5 is sensed via the temperature sensitive resistance element RTD. In the preferred embodiment, the resistive element RTD is a Nickel-Iron sensor built into the heater assembly to sense drum surface temperature and has a calibrated resistance of 187.11 to 390.91 ohms over a temperature range of 50° F. to 400° F. See Table I below.

TABLE I

| °F. | RTD | $E_o$(NOM) | $I_o$(ma) |
|---|---|---|---|
| 50 | 187.11 | .4744 | 3.5 |
| 100 | 211.35 | .5231 | 3.0 |
| 150 | 237.21 | .5725 | 2.5 |
| 200 | 264.70 | .6225 | 2.0 |
| 250 | 293.81 | .6727 | 1.5 |
| 300 | 324.55 | .7228 | 1.0 |
| 350 | 356.92 | .7728 | 0.5 |
| 400 | 390.91 | .8223 | 0.0 |

Thus, depending upon the temperature within the drum 5, the resistance of the resistive element RTD varies. This variation in turn, causes the voltage applied to the inverting or minus terminal of the buffer U5 to vary in a linear fashion. The voltage at the inverting terminal is determined by the parallel resistive network comprised of the resistive element RTD and resistor R16, and which combination produces a voltage proportional to the sensed temperature. This voltage is then coupled via the high impedance path containing resistor R17 to the inverting terminal.

The voltage on the non-inverting terminal of the buffer U5 is, in turn, established via the voltage dividing network of resistor R18 and potentiometer R19. Thus, depending upon the temperature within the drum 5, the voltage on the inverting terminal of the buffer U5 varies and is amplified in accordance with its relative separation from the voltage on the non-inverting terminal of the buffer U5. It should be noted that the potentiometer R19 permits the adjustment of the voltage level on the non-inverting terminal of the buffer U5 and the corresponding calibration of the rotary controller 19 relative to the set-point voltage of the remote stationary controller 9.

The output signal of the buffer U5, in turn, is coupled to the gate of the field effect transistor (FET) Q2 so as to control the drain to source current flow through the FET Q2. The drain to source current flow through the FET Q2, in the preferred embodiment, is adjustable due to the resistive network of resistors R22 and R23 and potentiometer R21. This network and potentiometer R19 thus permits the operator to adjust the drain to source current flow relative to the gate current, and thus calibrate the rotary controller 19 so as to produce a current flow on conductor 38 of 0 milliamps at 400° Fahrenheit and 40 milliamps at 0° Fahrenheit. These current flows, in turn, correspond to and establish the previously mentioned 10 millivolt per degree Fahrenheit separation at the junction J1 of the stationary controller 11.

Thus, the potentiometers R9, R19 and R21 permit the operator to calibrate the temperature sensitivity of the rotary controller 19 relative to the set-point of the stationary controller 11 so as to ensure that the current on conductors 38 and 24 is a true measure of the temperature within the rotating drum 5. It is to be noted too that the calibration of the constant current through the slip ring and brush ring combination 13 effectively negates any losses that might occur therein. As a consequence of this calibration, the voltage on the junction J1 is a very accurate measure of the temperature within the rotating drum 5. Accordingly, it is to be noted that the voltage at the junction J1 can additionally be coupled to a voltmeter that contains a scale calibrated to temperature or a current meter calibrated in temperature per Table 1 can be placed in series with line 24 so as to permit the operator to visually read the temperature within the rotating drum 5. Furthermore, the junction J1 can be coupled to additional circuitry having various temperature limits so as to further control temperature cycling within any process employing the presently controlled rotating drum 5. Because in the system of the present invention the current is inversely proportional to temperature (see Table 1), if the rotating controller should fail or the line 24 and its associated connections should be inadvertently opened, the stationary controller will shut down the power to the drum, thus providing a fail-safe feature.

As is apparent from the employment of the slip ring coupling arrangement of the present invention, the stationary controller 11 can be remotely placed from the rotary controller 19 as well as contain any of the above mentioned devices that might be coupled to the J1 junction. Additionally, it should be noted that while only one heater element 30 has been shown, others might be connected in parallel with element 30 within the rotating drum 5 so that each heats a separate zone of the drum 5. It is also contemplated that the ohmic value of the parallel connected elements may be tailored so that more heat energy is developed in predetermined areas than in others. Where independent temperature regulation is required for any given zone, it would be necessary to use separate stationary and rotary controllers 11 and 19 and separate slip rings and brushes for each such zone.

While the present invention has been described with respect to its preferred embodiment as well as with respect to various alternative arrangements, it should be recognized that still other alternative embodiments might be contemplated by one of skill in the art upon a reading hereof. Accordingly, the following claims should be interpreted so as to encompass any of such equivalent structures that fall within the spirit and scope of the presently disclosed and claimed invention.

What is claimed is:

1. A closed loop controller for a rotatable heating system comprising:
   (a) a rotatable member having at least one heating element mounted thereto;
   (b) means rotating with said rotatable member for sensing the temperature of said heating element and including means for differentially producing a magnitude varying current control signal of at least a minimum magnitude and proportional to the sensed temperature and further including means for establishing a range within which the current control signal might vary relative to temperature changes of said heating element;
   (c) stationary means remote from said rotatable member for comparing said current control signal to a set-point control signal of a selectable magnitude corresponding to a desired temperature at said heating element and including means for producing a third control signal so long as an inequality exists;
   (d) switch means responsive to said third control signal for applying power to said heating element; and
   (e) first slip ring means for coupling said current control signal to said stationary means and second slip ring means for coupling said power to said heating element; and wherein
   (f) the minimum magnitude of said current control signal is set relative to said set-point control signal and said first slip ring means so as not to be affected by noise at said first slip ring means.

2. A closed loop controller as set forth in claim 1 wherein said stationary means includes means for synchronizing the application of power by said switch means relative to a predetermined reference level of said power signal.

3. A closed loop controller as set forth in claim 1 wherein said stationary means produces said third control only so long as the level of said current control signal is less than level of said set-point control signal, thereby preventing thermal runaway should the magnitude of said current control signal rise above that of said set-point control signal.

4. Temperature control apparatus for a rotatable heating system comprising:
   (a) a rotatable heating member having at least one heating element;
   (b) means rotating with said rotatable member and coupled to a stationary controller and a power supply via a plurality of respective control and power slip rings for resistively sensing the temperature of said heating element, including means for comparing the sensed temperature to a reference signal of a selected magnitude and producing a current control signal proportional to the sensed temperature within a predetermined range about the magnitude of said reference signal and wherein the magnitude of the current control signal varies inversely to said temperature;

(c) stationary means responsively coupled to said current control signal via said control slip rings for comparing said magnitude varying current control signal to a separately selected set-point control signal, the magnitude of which set-point control signal corresponds to a desired temperature, and including means for producing a third control signal so long as the magnitude of said current control signal is less than that of said set-point signal;

(d) means coupled to said power slip rings for applying power to said heating element in response to said third control signal and in synchronization with the zero-crossings of an AC power supply signal; and wherein (e) the magnitude of the reference signal at said rotating means is selected to be sufficiently large so as not to be affected by noise at said control slip rings.

* * * * *